United States Patent
Kamst

(10) Patent No.: US 6,310,264 B1
(45) Date of Patent: Oct. 30, 2001

(54) METHOD FOR PROCESSING MATERIAL COMPRISING ALUMINUM AND PLASTIC

(75) Inventor: Ronald Gerard Kamst, Drunen (NL)

(73) Assignee: Alcoa Nederland B.V., Drunen (NL)

( * ) Notice: Subject to any disclaimer, the term of this patent is extended or adjusted under 35 U.S.C. 154(b) by 0 days.

(21) Appl. No.: 09/424,761

(22) PCT Filed: May 29, 1998

(86) PCT No.: PCT/NL98/00315

§ 371 Date: Jan. 31, 2000

§ 102(e) Date: Jan. 31, 2000

(87) PCT Pub. No.: WO98/53969

PCT Pub. Date: Dec. 3, 1998

(30) Foreign Application Priority Data

May 30, 1997 (NL) .................................................. 1006179

(51) Int. Cl.[7] .................................. C07C 1/00; B09B 3/00
(52) U.S. Cl. ............................ 585/241; 201/2.5; 201/25; 422/184.1
(58) Field of Search ............................. 585/241; 201/2.5, 201/25; 422/184.1

(56) References Cited

U.S. PATENT DOCUMENTS

| | | | |
|---|---|---|---|
| 3,650,830 | 3/1972 | Mathis | 134/19 |
| 5,731,483 * | 3/1998 | Stabel et al. | 585/241 |
| 5,841,011 * | 11/1998 | Hashimoto et al. | 585/241 |
| 5,849,964 * | 12/1998 | Holighaus et al. | 585/241 |
| 6,126,907 * | 10/2000 | Wada | 422/184.1 |
| 6,178,899 * | 1/2001 | Kaneko et al. | 110/346 |
| 6,182,584 * | 2/2001 | Gaudio | 110/229 |

FOREIGN PATENT DOCUMENTS

| | | | |
|---|---|---|---|
| 0 448 178 | 9/1991 | (EP) . | |
| 0 636 674 | 2/1995 | (EP) . | |
| 0 912 182A1 * | 6/1999 | (EP) | C10J/3/66 |
| 56 133432 | 10/1981 | (JP) . | |
| 60 230942 | 11/1985 | (JP) . | |
| 06 254529 | 9/1994 | (JP) . | |

* cited by examiner

Primary Examiner—Bekir L. Yildirim
(74) Attorney, Agent, or Firm—Young & Thompson

(57) ABSTRACT

A method for processing material comprising combinations of aluminum and plastic, such as aluminum bottle caps having a plastic coating, comprising the steps of: pyrolyzing the plastic in an inert atmosphere, cracking or gasifying the gases or vapours which are released in the course of pyrolysis, afterburning the coke which remains behind on the aluminum in the course or pyrolysis. The gases or vapours released are recirculated and are used, during pyrolysis, as an inert, oxygen-free medium.

10 Claims, 1 Drawing Sheet

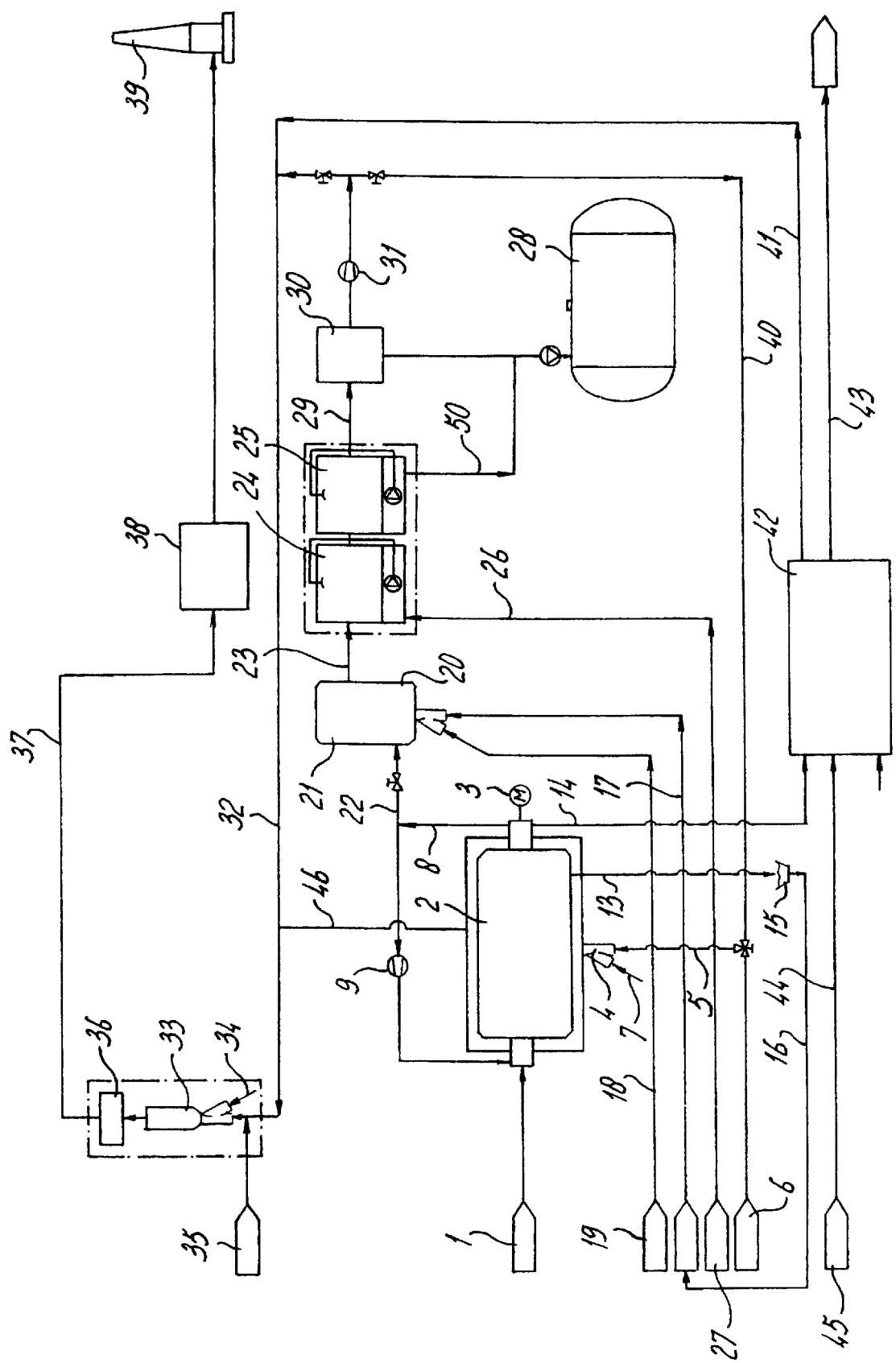

METHOD FOR PROCESSING MATERIAL COMPRISING ALUMINUM AND PLASTIC

CROSS REFERENCE TO RELATED APPLICATION

This is the 35 USC 371 national stage of International application PCT/NL98/00315 filed on May 29, 1998, which designated the United States of America.

FIELD OF THE INVENTION

The invention relates to the processing of waste materials comprising combinations of aluminium and plastic. Such materials are used on a large scale, inter alia, in the packaging industry, for example in the packaging of drinks and the like. Known examples are the cans for soft drinks and beer; with bottles, too, such materials are used in the cap. These caps are made of aluminium and are internally coated with a plastic sealing layer.

BACKGROUND OF THE INVENTION

The caps are usually attached to the neck of the bottle by means of a screw thread. They can be provided with a safety strip which is broken when the bottle is opened. Such bottle caps produce a large amount of waste material which is difficult to reprocess. The plastic coating is quite firmly embedded in the cap and can be removed only with a great deal of effort. On the other hand, the plastic coating hinders the reprocessing of the aluminiun. The plastic residues would result in such contamination of the smelted aluminium as to make it unsuitable as a raw material.

The plastic coating in the bottle cap usually consists of PVC. This material, in contrast to many other plastics, does not affect the taste of the drink and can therefore not readily be replaced by some other substance which presents fewer problems during reprocessing.

On the other hand, the reprocessing of such materials, in particular bottle caps, has major advantages. First of all, the reprocessed aluminium constitutes an inexpensive raw material, in any case in comparison with production from bauxite. In the case of bottle caps, a closed cycle would be achievable, in which the aluminium can be continuously used for new bottle caps.

Account must also be taken of the fact that the fabrication of bottle caps makes use, as the starting material, of a plate or roll of aluminium which is printed beforehand with the desired lettering, designs and the like. From these plates the caps are then punched, waste material remaining behind which is partially printed. This material remaining behind when the caps are punched out would likewise have to be reprocessable at the same time, in order for a complete cycle to be achievable.

SUMMARY OF THE INVENTION

It is therefore an object of the invention to provide a method by means of which materials comprising combinations of aluminium and a plastic, in particular like those present in bottle caps, can be reprocessed into a usable raw material. To this end, the invention comprises the steps of:
  pyrolysing the plastic in an inert atmosphere,
  cracking or gasifying the gases or vapours which are released in the course of pyrolysis,
  afterbuning the coke which remains behind on the aluminium in the course of pyrolysis.

The pyrolysis step is continued for a sufficiently long period to ensure that the HCl has been completely removed from the PVC of the coating in the bottle cap. The gases or vapours released in the process are recirculated and used as an inert, oxygen-free medium for creating the desired inert atmosphere during pyrolysis.

The gases or vapours released are then scrubbed to remove HCl and are used as an energy source for the pyrolysis process.

To supply the required energy to the pyrolysis process, the recirculated gases or vapours are heated.

In combination with the complete removal of the HCl, as cited above, pyrolysis is preferably carried out at an oxygen level of less than 0.2 vol % over a period of approximately 20 minutes.

For the purpose of complete removal of the coke formed during pyrolysis from the aluminium, the afterburning is preferably carried out at an oxygen level of 1.6% over a period of approximately 10 minutes.

The method according to the invention can be used to process not only PVC, but also materials comprising PE and/or PP. The material can also comprise paints and/or varnishes.

The method according to the invention is particularly suitable, as already stated, for processing bottle caps, wherein the material has a composition of approximately 70% Al, 20% PVC, 6% PE, 3% varnish and residues such as sugars.

BRIEF DESCRIPTION OF THE DRAWINGS

The method according to the invention will now be explained with reference to the accompanying FIGURE, which is a schematic representation of the invention.

DETAILED DESCRIPTION OF THE INVENTION

The materials comprising combinations of aluminium and plastic, in the present case bottle caps 1, are fed to the pyrolysis drum 2. There the material is heated to approximately 550° C. over a period of approximately 20 minutes. Heating takes place in an oxygen-depleted atmosphere, the oxygen level being at most 2%. By means of motor 3, the drum is rotated continuously to allow all the material to be treated simultaneously.

At the start of the process, the drum is heated by means of burner 4, from which natural gas is supplied from source 6 via line 5, together with air 7.

The gases and vapours coming from the pyrolysis drum, in particular hydrocarbons and HCl, are reintroduced into the drum via line 8 and compressor 9. Since these recirculated gases and vapours contain virtually no oxygen, the oxygen-depleted atmosphere in the drum 2 is maintained.

From the drum 2, coke is discharged via line 13, and a mixture mainly comprising aluminium to which small amounts of coke are still adhering is discharged via line 14. Via the temporary storage 15 and line 16, 17, the coke, together with oxygen from a source 19 which is transported via line 18, is fed to the burner 20 of gasifier 21. Via line 46, the flue gas is discharged from the drum 2.

This gasifier 21 is also supplied, via line 22, with the excess hydrocarbons and HCl which form during pyrolysis. At 1200° C. these substances are then converted, in the gasifier 21, into CO, $CO_2$, water, hydrogen, $CH_4$ and HCl. These substances are successively fed, via line 23, to the cooling section 24 and the scrubbing section 25, where the HCl is scrubbed out. Via line 26, the required water is supplied from source 27 to the cooling section 24 and scrubbing section 25.

From the scrubbing section 25 water and salts are discharged, via line 50, to waste tank 28. The gases are supplied, via line 29 and gas drier 30, compressor 31 and line 32, to combustion apparatus 33 which is also fed with air 34 and possibly natural gas 35. The flue gases are cooled by cooling apparatus 36 and then, via line 37 and the activated carbon filter 38, discharged via stack 39.

The aluminium constituents with coke adhering to them, which are discharged via line 14, are fed to the afterburning apparatus. The material is treated therein for a period of approximately 10 minutes at 550° C. in an atmosphere having an oxygen level of approximately 1.6%. In the process the coke undergoes further combustion, aluminium is discharged from the apparatus 42 via line 43, and gases such as $CO_2$, nitrogen and oxygen are discharged via line 41. Together with gas from source 6, via line 40, these gases are supplied, via line 41, to the combustion apparatus 33.

Via feeder means 44, waste 45 which is produced in the fabrication of bottle caps can likewise be fed to the afterburning apparatus 42. This waste comprises the residues of aluminium plates which had first been printed and from which the blanks for the caps were then punched.

What is claimed is:

1. Method for processing material comprising combinations of aluminum and plastic, comprising the steps of:

pyrolyzing the plastic in an inert atmosphere by heating up to a temperature of approximately 550° C. so as to release gases or vapours, feeding the gases or vapours which are released in the course of pyrolysis to a gasifier so as to perform a cracking operation, afterburning coke which remains behind on the aluminum in the course of pyrolysis.

2. Method according to claim 1, wherein the gases or vapours released are recirculated and, during pyrolysis, are used as an inert, oxygen-free medium.

3. Method according to claim 2, wherein the gases or vapours released are scrubbed to remove HCl before they are used as an inert medium during pyrolysis.

4. Method according to claim 2, wherein the recirculated gases or vapours are heated.

5. Method according to claim 1, wherein the pyrolysis is carried out at an oxygen level of less than 0.2 vol % over a period of approximately 20 minutes.

6. Method according to claim 1, wherein the afterburning is carried out at an oxygen level of 1.6% over a period of approximately 10 minutes.

7. Method according to claim 1, wherein the material comprises aluminum bottle caps having a plastic coating which comprises a t least one of polyvinyl chloride (PVC), polyethylene (PE), and polypropylene (PP).

8. Method according to claim 1, wherein the material also comprises paints and/or varnishes.

9. Method according to claim 1 for processing bottle caps, wherein the material has a composition of approximately 70% Al, 20% PVC, 6% PE, 3% varnish and sugar residues.

10. Apparatus for implementing the method according to claim 1, comprising a pyrolysis drum provided with heater means for heating up to a temperature of approximately 550° C., a feeder means for bottle caps to be treated having a plastic coating, a discharge means for the aluminum material with adhering coke residues, and an afterburning apparatus which is connected to the discharge means of the pyrolysis drum.

* * * * *